United States Patent [19]
Hiratsuka

[11] 3,922,662
[45] Nov. 25, 1975

[54] DETECTOR FOR USE WITH A DUPLICATOR OR THE LIKE FOR DETECTING INCORRECTLY ALIGNED DOCUMENTS

[75] Inventor: Toshio Hiratsuka, Ebina, Japan

[73] Assignee: Fuji Xerox Co., Ltd., Tokyo, Japan

[22] Filed: May 2, 1974

[21] Appl. No.: 466,452

[30] Foreign Application Priority Data

May 18, 1973 Japan .................. 48-54729

[52] U.S. Cl. ........................... 340/259; 271/258
[51] Int. Cl.² ........................................... G08B 21/00
[58] Field of Search ............ 340/259; 271/258, 228; 200/61.19

[56] References Cited
UNITED STATES PATENTS

2,947,917   8/1960   O'Brien ....................... 271/258
3,623,058   11/1971  Maloney ....................... 340/259
3,734,604   5/1973   Szostak et al. ................ 340/259

*Primary Examiner*—Glen R. Swann, III
*Attorney, Agent, or Firm*—Gerald J. Ferguson, Jr.; Joseph J. Baker

[57] ABSTRACT

A detector may comprise at least one gripper of a plurality of grippers for a document drum used in a duplicator. A conductive path is established through the one gripper whenever a document (which is electrically insulative) is not gripped by the gripper. The establishment of the path actuates alarm circuitry for indicating that a fed document has been incorrectly aligned with respect to the drum.

2 Claims, 4 Drawing Figures

FIG. 2
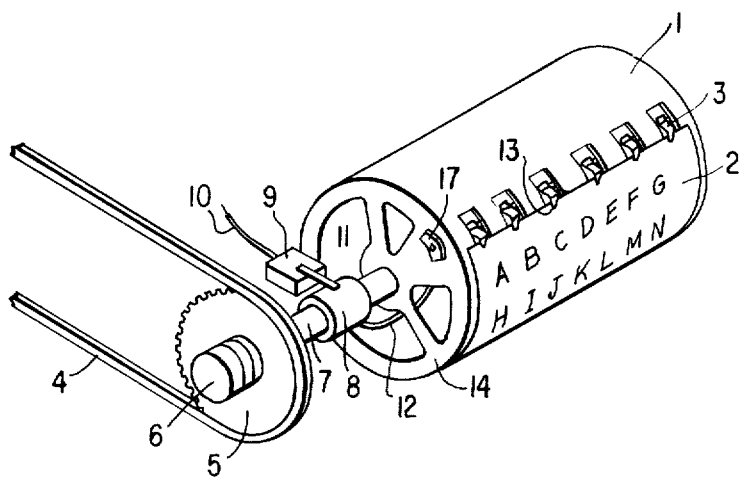
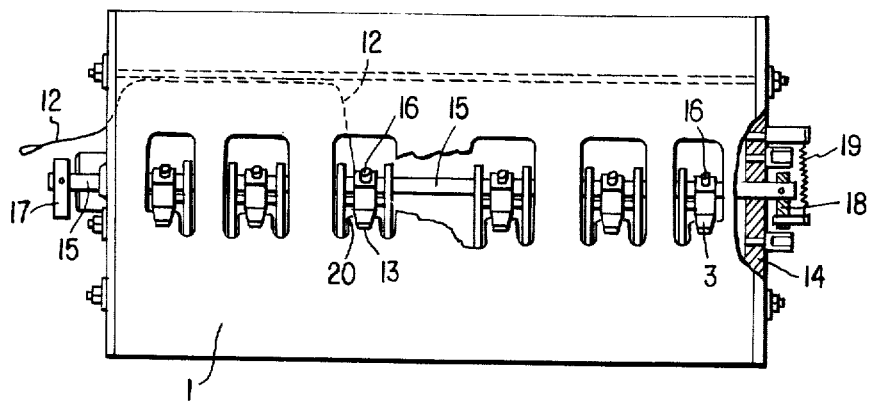
FIG. 3

DETECTOR FOR USE WITH A DUPLICATOR OR THE LIKE FOR DETECTING INCORRECTLY ALIGNED DOCUMENTS

BACKGROUND OF THE INVENTION

The present invention relates to a document feeder for a duplicator having a document transport device such as a document drum and, in particular, to a detector for use with a sheet gripper of a document feeder.

When a duplicator having a document drum is used, the operator of the duplicator should set the document in place so that the top side of the document makes a right angle with the direction of document movement. The duplicator is then switched on for printing. A gripper positioned on the manuscript drum is pressed into contact with the manuscript drum so that the gripper catches hold of the aforesaid top side of the document. The document drum is synchronously rotated with a photosensitive drum, as it carries the document. A latent image of the document image is formed on the photosensitive drum by an optical device positioned in the duplicator.

It has been found that with the above duplicators, a document is often incorrectly aligned with respect to the gripper (1) at the above-mentioned time when it is positioned in the duplicator by the operator thereof or (2) because of imperfect holding of the document by the gripper. This can result in the interior of the duplicator becoming jammed.

SUMMARY OF THE INVENTION

A primary purpose of the present invention is the provision of a novel duplicator capable of eliminating the above-mentioned defects inherent in conventional duplicators.

It is a further object of this invention to provide a novel duplicator having a detector capable of electrically detecting incorrect document alignment and quickly informing an operator of the mis-alignment so that the operation of the duplicator may be suspended to thereby prevent a secondary trouble such as clogging of the duplicator with documents.

Other objects and advantages of the invention will become apparent from a reading of the following specification and claims taken with the drawings.

BRIEF DESCRIPTION OF THE DRAWINGS

FIG. 2 is a perspective drawing of a document being carried in a document transport device in accordance with the present invention.

FIG. 3 is a front view of a document drum with a portion thereof shown in a section.

DETAILED DESCRIPTION OF THE INVENTION

Figure 1:
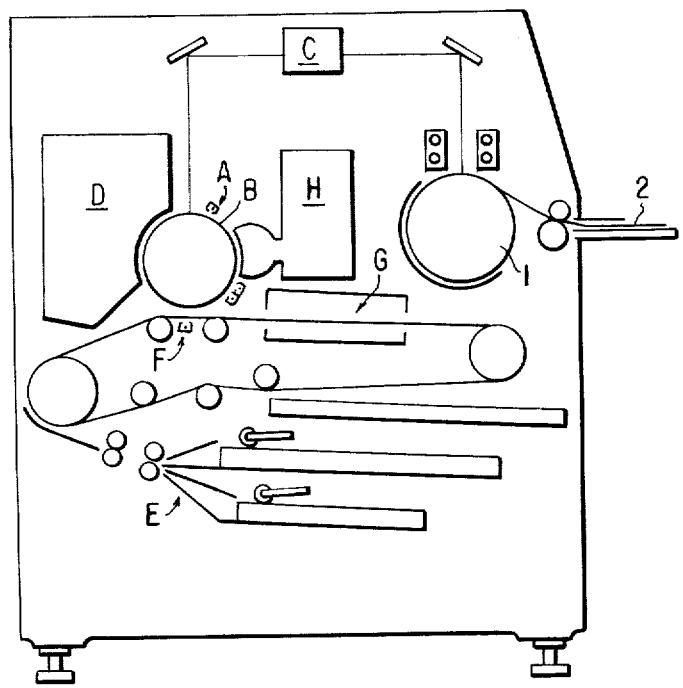
FIG. 1 is a schematic drawing of an outline of a known duplicator in which the detector of the present invention may be used.

Referring to FIG. 1, there is shown a conventional duplicator wherein a document 2 is rolled on a document drum 1 and transported forwardly. Concurrently a latent image of the document image is formed by an optical device C directly on a photosensitive drum B which is uniformly charged by charging device A. Thereafter, the latent image is visualized in a developing device D, and the image thus visualized is transcribed in a transcribing section F onto copy paper fed by a paper feeder section E. The visualized image thus transcribed on the copy paper is then fixed in a fixing section G. The residual electric charge, the developing agent and so forth remaining on the photosensitive drum are cleaned off in a cleaning section H.

FIG. 2 illustrates a document being carried by a document transport device. The torque of document drum 1 is transmitted first to a gear 5 from a motive power source (not shown) by means of a chain 4. A rod 7 is then rotated through an electromagnetic clutch 6. The rod 7 has a slip ring 8 mounted thereon and in contact therewith is a brush 11 connected to a cord 10 through a support 9. The slip ring 8 has one end of an insulated electric wire 12 connected therewith, the other end of the wire 12 being connected with an electroconductive gripper 13 to detect incorrect document alignment with respect to the gripper 3 of drum 1. Of course, more than one gripper may be used for this detecting function, if desired. As can be seen in FIG. 3, grippers 3 and 13 are fixed by screws 16 on a gripper rod 15 loosely engaged with the supporting sections on the both sides of drum 1. The gripper rod 15 has cams 17, 18 positioned on both ends thereof. Cam 17 contacts with a projection (not shown) positioned at a point adjacent one side of drum 1 so that gripper rod 15 together with grippers 3 and 13 are rotated in a known manner as the cam 17 passes the projection. Furthermore, a spring 19 may be positioned between cam 18 and drum side supporting section 14 so as to press grippers 3 and 13 against drum 1 in a known manner as the grippers pass the point to which the document has been fed by the duplicator operator.

Referring to FIG. 3, the surface of drum 1 is given a coat of an electrically insulative, light reflecting material much as a coat of white paint which matches the base color of the document; however, the portion 20 of the drum which contacts gripper 13 is not given a coat of the paint. Thus, an electrically conductive path is established through gripper 13 and drum 1 (which is also electroconductive) whenever gripper 13 is closed without a document gripped thereby. Gripper 13 is electrically insulated from drum 1 during standby preparatory to the gripping of a document.

Figure 4:
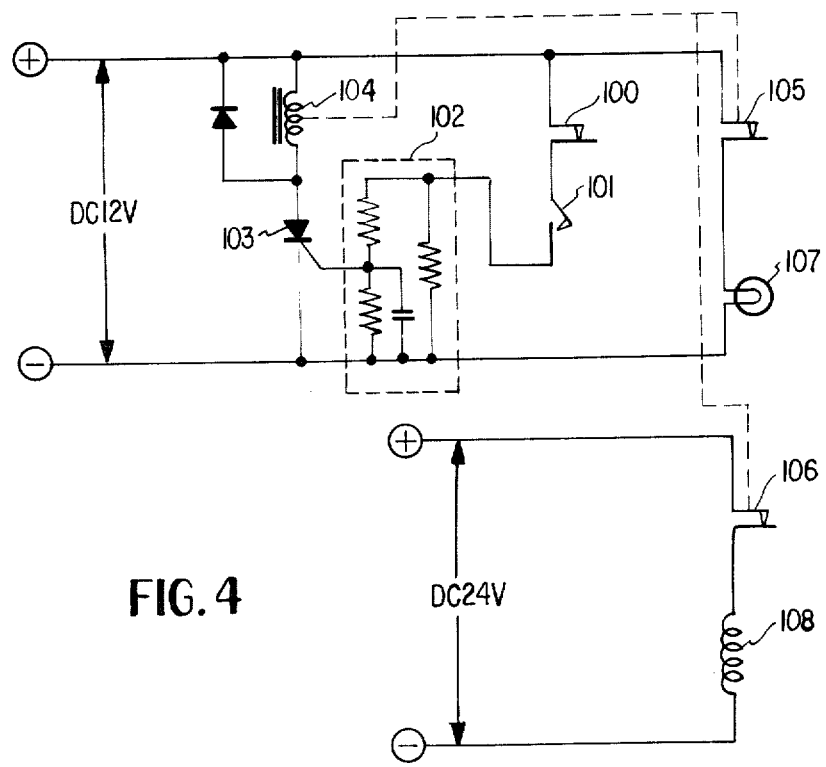
FIG. 4 is a schematic drawing of an illustrative alarm for use with the detector of the present invention.

Referring to FIGS. 3 and 4, duplicating is initiated by a circuit having 12 volts of alternating current applied thereto, a relay switch 100 being closed at this time. At the same time, the electrical contact between gripper 13 and drum 1 is prevented by document 2 which is electrically insulative and thus a switch 101 is open as shown in FIG. 4. One side of switch 101 may correspond to gripper 13 and the other to drum 1, the latter being connected by any of known means to the circuit of FIG. 4. Thus, rod 15 may be electrically insulated from gripper 13 but electrically connected to drum 1, and thus a brush (not shown) on rod 15 may be used to connect drum 1 to the circuit of FIG. 4.

If a document is incorrectly aligned with respect to grippers 3 and 13, switch 101 would then be closed when the document was gripped and a gate circuit 102 would actuate a thyristor 103 (a unidirectional 3-terminal silicon control element) thus exciting a relay coil 104. With relay coil 104 thus excited, relay switches 105 and 106 are closed. Thus, an alarm lamp 107 is switched on by relay switch 105. Also a coil 108 of electromagnetic clutch 6 (see FIG. 2) is excited, coil 108 being in circuit with a 24 volt alternating current supply and relay switch 106. Thus, rod 7 of drum 1 is disconnected from the motive power source, thus enabling manual revolution to be effectuated by an operator of the duplicator. Thus the operator of the duplicator is quickly informed of the incorrect alignment of manuscript 2. Hence, he is able to quickly take any measure which may be required. Thus, secondary troubles such as machine jamming can be prevented.

What is claimed is:

1. In a duplicator or the like having a document transport device including a plurality of grippers for the transported documents, the improvement of detecting documents incorrectly aligned with respect to the document feed device, said improvement comprising
    at least one of said grippers including an electrically conductive path extending from a first gripping member of said one gripper to the second gripping member thereof when said gripper is closed without a document therein;
    alarm means connected across said first and second gripping members for producing an alarm signal whenever said electrically conductive path is closed; and
    means for normally holding said grippers apart and closing said grippers when a document is fed to the transport device;
    said alarm means being inhibited whenever a fed document is correctly aligned with respect to the transport device since the electrically insulative nature of the document prevents said electrically conductive path from being closed when said one gripper is closed and said alarm means being actuated whenever said document is incorrectly aligned with respect to the transport device since said one gripper closes without said document being gripped thereby to thereby close said electrically conductive path.

2. The improvement as in claim 1 where said document transport device comprises
    an electrically conductive drum for transporting the documents past an image projection station, said drum having substantially all of the document bearing surface thereof coated with an electrically insulative, light reflecting coating;
    each of said first gripping members respectively extending through a plurality of axially extending openings in said drum and each of said second gripping members respectively comprising the portion of said drum against which said first gripping member is pressed when said grippers are closed;
    the second gripping member of said one gripper not being coated with said electrically insulative, light reflecting coating so that said electrically conductive path is established for said one gripper whenever it is closed without a document therein.

* * * * *